June 19, 1923. 1,459,387

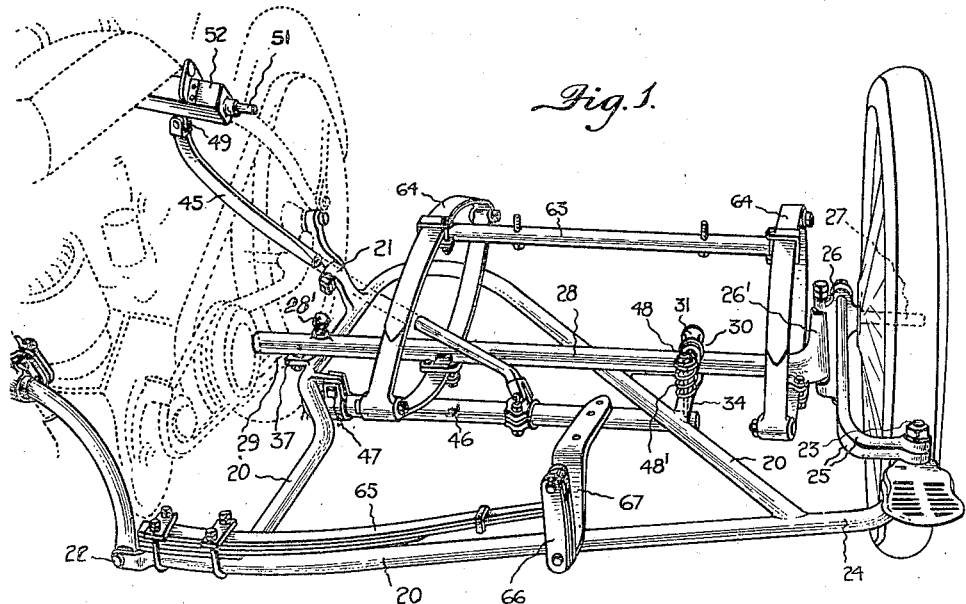
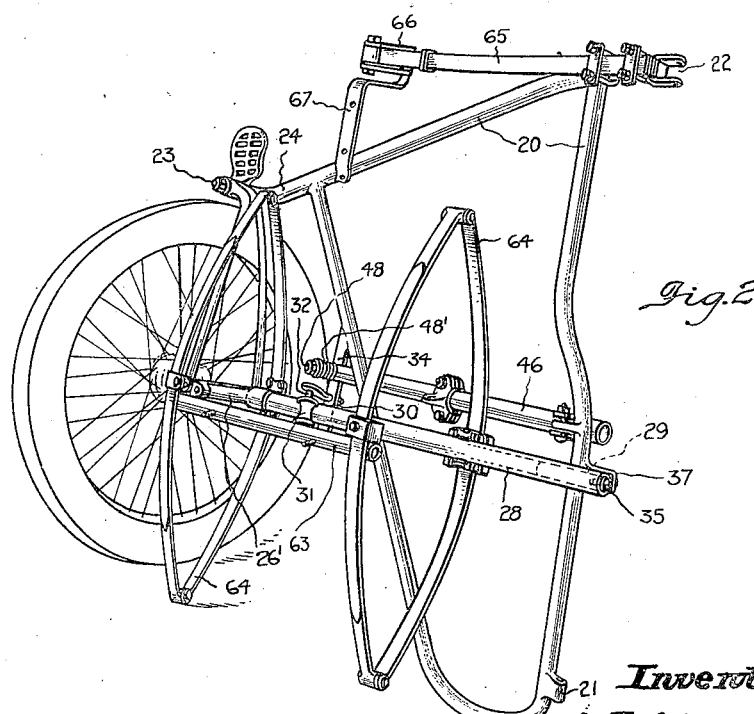

J. A. YEATS ET AL
SIDE CAR OF MOTOR CYCLES
Filed March 28, 1921    2 Sheets-Sheet 2

Inventors
J. A. Yeats
A. S. Swan
By Marsh &c
Attys

Patented June 19, 1923.

1,459,387

UNITED STATES PATENT OFFICE.

JOHN ALBERT YEATS, OF RICHMOND, AND ALBERT SAMUEL SWAN, OF COBURG, VICTORIA, AUSTRALIA.

SIDE CAR OF MOTOR CYCLES.

Application filed March 28, 1921. Serial No. 456,366.

*To all whom it may concern:*

Be it known that we, JOHN ALBERT YEATS and ALBERT SAMUEL SWAN, subjects of the King of Great Britain, residing at 295 Lennox Street, Richmond, and 98 The Avenue, Coburg, both in the State of Victoria, Commonwealth of Australia, respectively, have invented certain new and useful Improvements in Side Cars of Motor Cycles, of which the following is a specification.

This invention relates to improvements in side cars of motor cycles and refers especially to the chassis of side cars and means for mounting the side car wheel thereof.

The object of the invention is to provide a side car chassis having a side wheel mounted in such a way that it and the body are free to turn more or less in conformity with the cycle as the same is negotiating a curve. A further object of the invention is the provision of means for adjusting the angle of the cycle relatively with the side car chassis to permit of it being tilted to or from the said chassis to facilitate the turning of corners and thereby obviate uneven wear on tires and strains on the machine.

We accomplish the above mentioned object by pivotally supporting the inner end of the spindle of the side car wheel in the outer end of a transversely movable or "floating" axle carrying the side car body and in connecting the pivot point of the spindle to a forward part of the chassis whereby when the cycle is turned to negotiate corners the side thrust on the wheel will move the said transversely movable axle endwise and cause the said wheel to adjust itself to track with the cycle and in providing foot or hand controlled means for adjusting the angle of and for locking the wheel in any desired position.

The invention more particularly consists in mounting the spindle of the side car wheel pivotally in the outer end of a transverse axle which is adapted to support the side car body and to move endwise in bearings on the chassis or on the chassis and frame of the cycle and in connecting one or both ends of the spindle of the wheel or the movable part of the bearing therefor by a rigid link or yoke to a forward part of the chassis. The movable axle is connected by levers and connecting members to a foot or hand controlled lever which is adapted to be operated to thrust the said axle in either direction so as to positively adjust the angle of the wheel.

Provision is made also whereby the diagonal stay connecting the cycle frame to the chassis will not be subjected to shock or jar incident to the side car wheel or cycle passing over rough roads.

The means provided for effecting the adjustment of the angle of the cycle relatively to the chassis consists in hinging or pivoting the chassis frame upon the lower part of the cycle frame and providing means controlled from levers for adjusting the position of the upper of the lower end of the diagonal stay whereby the cycle can be tilted to or from the chassis.

In order that the invention may be more readily understood reference will now be had to the accompanying sheets of explanatory drawings, wherein—

Figure 1 is a view in perspective showing a side car chassis constructed in accordance with the present invention attached to motor-cycle.

Figure 2 is a view in perspective showing the chassis detached from the cycle and raised up and supported on its rear end.

Figure 7:
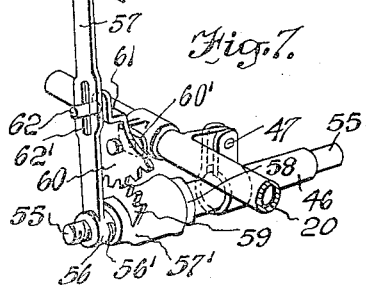

This view is drawn to a larger scale than Figs. 1 to 5 and parts are shown broken away for convenience of illustration. Fig. 7 is a view in perspective of the means for controlling the position of the lower end of the diagonal stay.

In these drawings the reference numeral 20 designates the side car chassis which is pivotally connected at 21 and 22 to brackets clamped securely to the frame of the cycle, and to a stud 23 on a lateral extension 24 on the forward end and outer part of the said chassis is pivoted an arm 25 having its rear end secured to a pivoted bracket 26 furnished with a short spindle 27 on which the side car wheel is supported.

The front bar of the chassis 20 inclines rearwardly or is disposed more or less at right angles to the cycle and the outer bar passes rearwardly from a point near the outer end of the front bar in a more or less straight diagonal or curved line to the cycle frame near the rear wheel thereof.

The pivoted bracket 26 carrying the spindle 27 is pivotally supported on the outer end of a transverse beam or axle 28 in a boss 26' and the said transverse beam or axle 28 is free to move endwise or "float" on bearings 29 and 30 on the chassis. The outer bearing 30 for the transverse axle is made sufficiently long to permit of the outer end of the said axle oscillating slightly when thrust endwise and this oscillatory movement is controlled by the amount of swinging movement imparted to the arm or arms 25 connecting the spindle 27 to the chassis.

The outer bearing 30 may comprise a roller 31 carried on a short spindle 32 supported in lugs secured to an angle shaped bracket 34 or the like on the chassis 20 as shown in Figures 1 and 2 of the drawings. The angle shaped bracket 34 is formed integrally with and projects horizontally from the diagonal bar of the chassis. The roller 31 is located above and is grooved to take the movable axle 28 and this said roller is free to move endwise over the spindle supporting the same with the end movement of the axle and oscillatory movement of the wheel.

Figure 5:
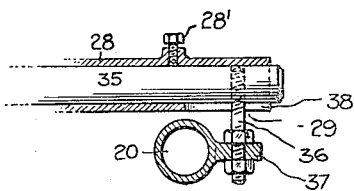
Figure 5 is a view in sectional elevation (drawn to a larger scale) of the part of the chassis frame and shows the bearing between the inner end of the transverse axle and the said chassis frame.
Figure 6:
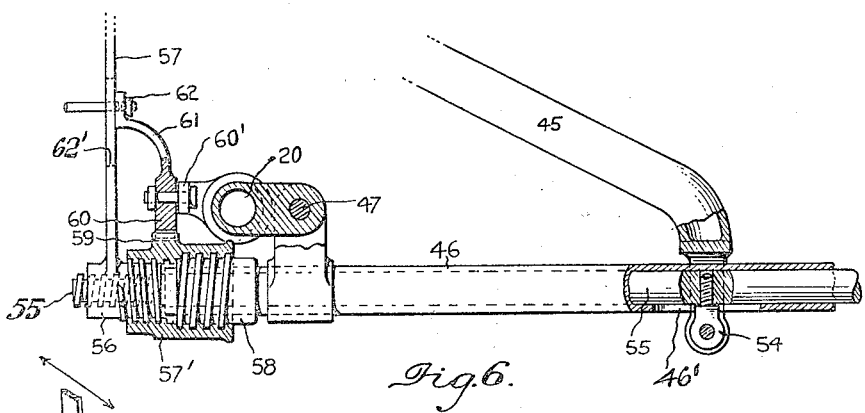
Figure 6 is a view in sectional front elevation of part of the chassis and shows means for adjustably securing the lower end of the diagonal stay to the transverse bar thereon.

The inner bearing for the movable axle 28 (when the latter is made of tubular material) comprises a piece of bar metal 35 which is adapted to slide freely in the said axle and is supported on a stud 36 secured to the inner part of the chassis or to a lug 37 thereon (see Figure 5). The underside of the axle is formed with a slot 38 to take the stud 36 and to provide for the free end movement of the axle and the said stud is adapted to pivot on the lug so as to enable the outer end of the axle to oscillate with the movement of the side car wheel. The axle 28 is provided with a set screw 28' (see Fig. 5) and this screw is tightened when it is desired to lock and retain the side car wheel in a fixed position relatively to the chassis.

Figure 3:
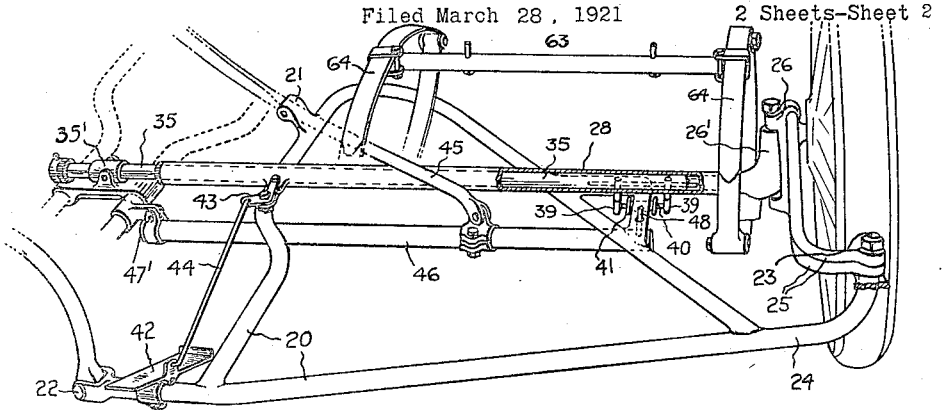
Figure 3 is a view in perspective of the side car chassis showing certain modifications in details of construction and having parts removed for convenience of illustration.
Figure 4:
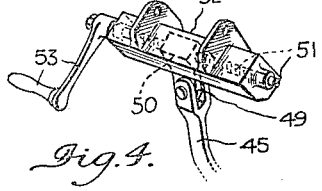
Figure 4 is a view in perspective of a device for adjustably securing the upper end of a diagonal stay to the cycle frame.

In an alternate construction of bearing for the outer part of the axle the bar 35 is extended to a point beyond the outer part of the chassis and at this point the said axle is slotted on its underside to take studs 39 depending from the bar (see Figure 3). The studs 39 support a short spindle 40 having a roller 41 mounted thereon and adapted to bear on the underside of the bracket 34 on the chassis. The spindle 40 is adapted to slide endwise through the roller 41 when the axle moves endwise upon the oscillation of the side car wheel.

If preferred the inner end of the movable axle 28 can be mounted in a bearing 35' fitted to the cycle frame as shown in Figure 3 of the drawings and when the said axle is mounted as illustrated it will be free to take the movements above described.

The slidably mounted axle 28 can be moved endwise to place and positively retain the wheel in position to take a turn in either direction by operation of a centrally pivoted foot controlled lever 42 which is connected to the said axle by means of a bell crank lever 43 and a rod 44 (see Figure 3).

The foot controlled lever 42 is pivotally mounted on the forward part of the chassis frame and the bell crank lever 43 is pivoted to the inside bar of the said frame near the axle 28. One end of the bell crank lever 43 is pivoted to a lug on the axle 28 and the opposite arm of the said lever is connected by the rod 44 to the foot controlled lever 42. When the upper end of the lever 42 is thrust forward an inward movement will be imparted to the axle and when the lower part of the said lever is thrust forward the axle will be moved outwardly thereby enabling the side car wheel to be positively set to track in a desired direction.

The device above described besides being used to impart an end thrust to the axle can be controlled to retain the axle and side car wheel in any desired position.

The provision of means as above described enables the rider of the cycle to positively control the angle of the wheel and to prevent it getting out of parallel or approximately parallel alignment with the front wheel of the cycle even when the rear wheel of the said cycle skids sideways in passing around curves.

The diagonal stay 45 for maintaining the cycle normally in an upright position and at right angles to the chassis is provided with any ordinary length adjusting means and has its upper end connected to the cycle frame and its lower end connected to a suitable point on the chassis or to a tubular bar 46 disposed transversely on the said chassis. The said transverse bar 46 has its inner end pivotally connected at 47 to the inner longitudinal bar of the chassis as shown in Figures 1 and 2 or to the cycle frame as shown at 47' in Figure 3, in such a way that its outer end may oscillate in a vertical plane. The outer end of the said transverse bar 46 is fitted with a vertical stud or bolt 48 which passes through a hole in the angle shaped bracket 34 of the chassis or a bracket thereon and is fitted with a spring 48' which is arranged to maintain an upward pressure on the said outer end of the bar.

The object in resiliently supporting the transverse bar 46 in the manner above described and as shown in the drawings is to provide means whereby all shock and jar on the diagonal stay 45 and imparted indirectly to the chassis and cycle frame will be obviated or minimized when the machine is passing over rough roads.

In an alternate construction the inner ends of the transverse members of the chassis are pivotally connected to the cycle frame in such a way that the cycle can be tilted toward or away from the same. In this instance the upper end of the diagonal stay 45 is connected to the cycle frame in such a way that it can be moved laterally thereon to cause the cycle to tilt in the direction required. The upper end of the stay 45 is pivotally connected to a lug 49 depending from a nut 50 which is mounted on a screwed bar 51 supported horizontally in a guide bracket 52 bolted to the cycle frame (see Figure 4).

The nut 50 is made to fit loosely in the bracket so that when the screwed bar 51 is rotated by turning a lever 53 fitted thereto the said nut will be free to move laterally within the bracket without rotating and so cause the cycle to be tilted to the angle required.

In an alternate construction the lower end of the diagonal stay supporting the cycle in an upright position is pivotally connected to a stud or lug 54 depending from a solid bar 55 slidably mounted in the tubular bar 46 which is pivotally mounted near its inner end to the chassis, as at 47. The tubular bar 46 is slotted on its under side at 46' to permit of the lug 54 moving freely when the solid bar 55 slides endwise in the said tubular bar. The bar 55 projects beyond the inner end of the tubular bar 46 and is screw threaded to take a screwed boss 56 on the end of a lever 57 which projects upwardly to within easy reach of the rider of the cycle. The outer end of the boss 56 is provided externally with a screw thread 56' of opposite pitch to that on the bar 55 and the said screw 56' on the boss is adapted to take the screwed inner end of a sleeve coupling 57' the outer end of which is screwed internally with a thread of opposite pitch to engage a thread formed on a fixed sleeve 58 fitted to the tubular bar 46. The purpose of the screw threaded connection between the boss 56 and the bar 55 is to obtain a greater end movement of the said bar than would be possible by only using the said coupling. The sleeve 58 and the bar 55 are not free to rotate and consequently the operation of the lever 57 in one direction and the rotation of the sleeve coupling 57' in the opposite direction causes the bar to be moved inward or outward according to the direction of movement of the said lever. The pitch of the thread on the bar 55 is opposite to that of the thread on the boss 56 of the said lever and consequently the movement of the boss tends to move the bar in the same direction as that accomplished by the movement of the sleeve coupling in the reverse direction.

The sleeve coupling 57' is formed on its periphery with gear teeth 59 which mesh with the teeth of a quadrant 60 pivoted to a lug 60' fitted to the inner bar of the chassis frame. The quadrant 60 is provided with an arm 61 which is fitted with a stud or bolt 62 having a sliding engagement with a slot 62' in the lever 57.

The screw threads on the bar 55, boss 56 and sleeves 57' and 58 are given a quick pitch and when the lever 57 is thrust forwardly or rearwardly the connection between the said bar 55 and the tubular bar 46 will cause the bar 55 to be moved endwise and so cause the lower end of the diagonal stay to be actuated to tilt the cycle in the direction required.

The gear teeth 59 on the sleeve 57' and on the quadrant or sector 60 are made sufficiently long to ensure them meshing even when the bar 46 is pivoted at 47 in consequence of end movement being imparted to the bar 55 to tilt the cycle. The stud 62 likewise is made long enough to ensure it remaining in the slot 62' when the lever 57 moves laterally in consequence of the pivotal movement of the rod 55 and the tubular bar 46.

With this latter form of construction of the invention the outer end of the tubular bar 46 is resiliently supported on the bracket 34 on the diagonal bar of the chassis and its inner end is pivotally connected to the inner longitudinal member of the chassis as hereinbefore described.

The side car body (not shown) is supported on a bar 63 connected to elliptic leaf springs 64 clamped to the sliding axle 28 supporting the side car wheel and on a quarter elliptic leaf spring 65 fitted to a front of the chassis. The front spring 65 is set transversely on the chassis and its free end is connected to the side car body by means of a shackle 66 and bracket 67 or in any other approved way. The side car body when supported as above described will swing more or less in conformity with the movement of the side car wheel thereby enabling the said wheel to be placed close to the outside of the said body.

A side car chassis constructed as hereinbefore described will be durable in construction, will ensure comfort to the passenger in the side car and the rider of the cycle, and will obviate side thrust on the wheels and excessive wear and tear on tires.

We claim:

1. A chassis for side cars of motor cycles comprising a frame having a pivotal connection with a cycle frame, a transverse axle movably mounted on the chassis frame and having a spindle pivotally mounted on the outer end thereof for carrying the side car wheel, and means for connecting the pivot part of the said spindle to a forward part of the chassis frame whereby the side car wheel will be free to turn in conformity with the front wheel of the cycle.

2. A chassis for side cars of motor cycles comprising a frame having a pivotal connection with a cycle frame, a transversely disposed axle mounted to slide endwise and oscillate horizontally on the chassis frame, a spindle pivoted to the outer end of the said axle and adapted to support a side car wheel, and an arm projecting forwardly from the pivot point of the said spindle and having its end pivotally mounted on a forward part of the chassis frame whereby the said side car wheel is free to oscillate to turn in conformity with the front wheel of the cycle in turning corners.

3. A chassis for side cars of motor cycles comprising a frame having its inner side adapted to be secured to a cycle frame, a transversely disposed axle mounted to slide endwise in bearings on the chassis frame, a spindle on a bracket pivoted to the outer end of the axle, and adapted to support a side car wheel, arms fitted to the bracket and pivotally connected to the chassis frame in advance of the side car wheel, a bar having its inner end pivoted to the chassis frame and its outer end resiliently connected to the outer part of the said frame, and a diagonal stay having one end pivoted to the said bar and its opposite end connected to the cycle frame.

4. A chassis for side cars of motor cycles comprising a frame connected to the cycle frame, a transversely disposed axle mounted movably on the chassis frame and having a spindle for the side car wheel pivotally supported on the outer end thereof, an arm connected rigidly to the spindle and having its end pivotally connected to a forward part of the chassis frame, resilient suspension devices on the transverse axle supporting the rear and a resilient suspension device on the front of the chassis frame supporting the front of the side car body, a resiliently mounted bar supported transversely on the chassis frame, and a diagonal stay connecting the resiliently mounted bar to the cycle frame.

5. In a chassis for side cars of motor cycles a bar disposed transversely on the chassis frame and having one end pivoted to one side and its other end resiliently connected to the opposite side of the said frame, a diagonal stay having its lower end pivotally connected to the transverse bar and its upper end fitted to the cycle frame.

6. In a chassis for side cars of motor cycles a chassis frame hingedly connected to a cycle frame, a transverse axle mounted to slide endwise in bearings on the chassis frame, a spindle pivotally mounted on the outer end of the transverse axle and supporting a side car wheel, arms projecting forward from the spindle and pivoted to the frame in advance of the said wheel, resilient suspension devices fitted to the transverse axle and to a forward part of the chassis frame, and a side car body supported on the resilient suspension devices.

7. In a chassis for side cars of motor cycles a transversely disposed axle mounted to move freely in an endwise direction and its outer end free to oscillate horizontally, a spindle for a side car wheel pivotally mounted on the outer end of the axle and fitted rigidly to forwardly projecting arms, and a pivotal support for the arms in advance of the centre line of the side car wheel whereby the said side car wheel will turn in conformity with the movement of the cycle.

8. In a chassis for side cars of motor cycles a frame having pivotal connections with the cycle frame, a bar disposed transversely on the chassis frame and having one end pivotally and the other end resiliently mounted on the chassis frame, a diagonal stay having one end connected to the transverse bar and the other end connected to the cycle frame, and means for adjusting the position of one end of the stay to enable the cycle to tilt toward and away from the chassis when negotiating curves.

9. In a chassis for side cars of motor cycles a frame having pivotal connections with the cycle frame, a bar disposed transversely on the chassis frame and having one end pivotally and the other end resiliently mounted on the chassis frame, a diagonal stay having its lower end pivotally mounted on the said bar, and its upper end pivotally connected to a nut supported non-rotatably on a horizontal screw rotatably mounted in a bracket secured to the cycle frame, and means for rotating the said screw to adjust the position of the said nut laterally thereon.

10. In a chassis for side cars of motor cycles a frame having pivotal connections with the cycle frame, a transversely disposed axle mounted slidably in a bearing on the cycle frame and its outer part slidably and oscillatingly mounted in a bearing on the outer part of the chassis frame, a spindle for supporting a side car wheel fitted to a bracket pivotally mounted on the outer end of the axle, and arms having their rear ends rigidly secured to the said bracket and their forward ends pivoted to a forward part of the chassis frame.

11. In a chassis for side cars of motor cycles a chassis frame pivotally connected to the cycle frame, a transversely disposed axle mounted movably in bearings on the chassis frame, a spindle for the side car wheel pivotally mounted on the outer end of the axle, an arm fitted rigidly to and projecting forwardly from the pivot part of the spindle, a pivotal connection between the forward end of the arm and the chassis frame, a lever and connections for imparting an end movement to the axle, and means for locking the said axle against movement.

12. In a chassis for side cars of motor cycles as claimed in claim 11 a bell crank pivoted to the chassis frame, a pivotal connection between one arm of the bell crank and the axle, a lever pivoted to the chassis frame, and a rigid connection between the lever and the second arm of the bell crank.

In testimony whereof we affix our signatures in the presence of two witnesses.

JOHN ALBERT YEATS.
ALBERT SAMUEL SWAN.

Witnesses:
G. R. CULLEN,
WILLIAM A. ASHTON.